United States Patent

Scholl et al.

Patent Number: 4,745,175
Date of Patent: May 17, 1988

[54] CONDENSATION PRODUCTS OF THIOALKYLENE OXIDES OF POLYTHIO-ALKYLENE OXIDES WITH POLYALKYLENE OXIDES, THEIR PREPARATION AND THEIR USE AS BREAKERS FOR WATER-IN-OIL EMULSIONS

[75] Inventors: Thomas Scholl, Krefeld; Wolfgang Oberkirch, Leverkusen; Hermann Perrey, Krefeld, all of Fed. Rep. of Germany

[73] Assignee: Bayer Aktiengesellschaft, Leverkusen, Fed. Rep. of Germany

[21] Appl. No.: 821,568

[22] Filed: Jan. 22, 1986

[30] Foreign Application Priority Data

Feb. 12, 1985 [DE] Fed. Rep. of Germany ....... 3504645

[51] Int. Cl.$^4$ .......................................... C10M 105/08
[52] U.S. Cl. ..................... 528/380; 528/373; 528/377; 252/358; 568/39
[58] Field of Search ................... 568/39; 528/380, 373, 528/377; 252/358

[56] References Cited

U.S. PATENT DOCUMENTS

| | | | |
|---|---|---|---|
| 3,087,899 | 4/1963 | Esser et al. | 521/65 |
| 3,662,003 | 5/1972 | Umbach et al. | 568/46 |
| 4,182,690 | 1/1980 | Suzuki et al. | 252/358 |
| 4,183,821 | 1/1980 | Langdon et al. | 252/331 |
| 4,266,080 | 5/1981 | Falk et al. | 568/50 |

FOREIGN PATENT DOCUMENTS 1216229 4/1960 France .
2020199 7/1970 France .

*Primary Examiner*—John Kight
*Assistant Examiner*—M. L. Moore
*Attorney, Agent, or Firm*—Sprung Horn Kramer & Woods

[57] ABSTRACT

New sulphur-containing polyethers based on optionally polymeric thioalkylene oxides and polyalkylene oxides, method for their preparation and their use as breakers for water-in-oil emulsions, in particular, as breakers for crude oil emulsions. The polyethers are of the formula

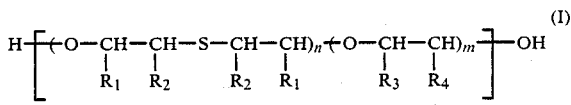

in which $R_1$ and $R_2$, independently of each other, represent hydrogen and/or a straight-chain or branched $C_1$ to $C_{20}$ alkyl group, $R_3$ and $R_4$, independently of each other and independently of adjacent

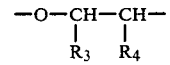

groups, represent in each case hydrogen, a straight-chain or branched $C_1$ to $C_{20}$ alkyl group and/or for —A—O—B, where A denotes a straight-chain or branched $C_1$ to $C_{20}$ alkylene group and B denotes a straight-chain or branched $C_1$ to $C_{20}$ alkylene-OH group or a

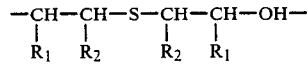

group with $R_1$ and $R_2$ as defined above,
n represents an integer from 1 to 100 and
m represents an integer from 10 to 2,500.

7 Claims, No Drawings

CONDENSATION PRODUCTS OF THIOALKYLENE OXIDES OF POLYTHIO-ALKYLENE OXIDES WITH POLYALKYLENE OXIDES, THEIR PREPARATION AND THEIR USE AS BREAKERS FOR WATER-IN-OIL EMULSIONS

BACKGROUND OF THE INVENTION

The present invention relates to new sulphur-containing polyethers based on (poly)thioalkylene oxides and polyalkylene oxides, their preparation from thiodiglycols and/or polythioglycols and polyalkylene oxides, and also their use as breakers for water-in-oil emulsions, in particular, as breakers for water-in-crude oil emulsions.

Petroleum is predominantly extracted in the form of aqueous emulsions, mainly in the form of water-in-oil emulsions, which are in general stabilized by substances contained in the petroleum and also by very finely divided solids extracted at the same time from the deposit. Frequently salts, e.g., sodium chloride, potassium chloride and/or magnesium chloride, are dissolved in the emulsified water. Transport costs, problems resulting from high viscosities of the emulsions and corrosion problems in the processing plants make it necessary essentially to dehydrate the crude oil before it is transported and/or before it is processed, i.e., to break the extracted emulsion.

The breaking of frequently very stable emulsions of this type takes place in general through the addition of interphase-active compounds, so-called demulsifiers or emulsion breakers, frequently assisted by heating the emulsion and/or additional application of electric fields.

In this case the residual water content, the salt and the ash content in the remaining crude oil and the residual oil content in the water separated off are critical for the quality of the emulsion breakers. The aim is to minimize these parameters while at the same time minimizing the concentration of the emulsion breaker used, its duration of action and its temperature of use.

The products used hitherto for the breaking of crude oil emulsions, e.g., block polymers of ethylene oxide and/or 1,2-propylene oxide (see, for example, U.S. Pat. No. 2,964,478), oxalkylated phenol resins (see, for example, U.S. Pat. No. 2,499,370 and U.S. Pat. No. 2,499,368) and block or mixed polymers of ethylene oxide and 1,2-propylene oxide crosslinked with diisocyanates, dicarboxylic acids, formaldehyde and/or diglycidyl ethers (see, for example, European Published Application 55,434 and European Published Application 55,433) are disadvantageous since they in general only partially fulfill the requirements. Thus, the breaking frequently proceeds slowly and incompletely unless the temperatures are relatively high. Known emulsion breakers are also frequently satisfactorily effective only for special emulsions, are not generally usable and are sufficiently effective only in relatively high dosages.

SUMMARY OF THE INVENTION

New chemical substances of the formula (I)

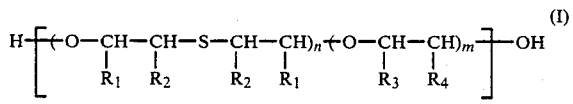
(I)

have now been found in which $R_1$ and $R_2$, independently of each other, represent hydrogen and/or a straight-chain or branched $C_1$ to $C_{20}$ alkyl group, $R_3$ and $R_4$, independently of each other and independently of adjacent

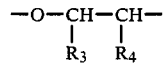

groups, represent in each case hydrogen, a straight-chain or branched $C_1$ to $C_{20}$ alkyl group and/or —A—O—B, where A denotes a straight-chain or branched $C_1$ to $C_{20}$ alkylene group and B denotes a straight-chain or branched $C_1$ to $C_{20}$ alkylene-OH group or a

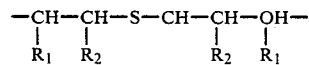

group with $R_1$ and $R_2$ defined as above, n represents an integer from 1 to 100 and m represents an integer from 10 to 2,500.

Of the new substances of the formula (I) those are preferred in which $R_1$ and $R_2$, independently of each other, represent hydrogen and/or a straight-chain or branched $C_1$ to $C_6$ alkyl group, $R_3$ and $R_4$, independently of each other and independently of adjacent

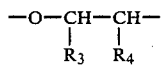

groups, represent in each case hydrogen, a straight-chain or branched $C_1$ to $C_6$ alkyl group, n represents an integer from 1 to 50 and m represents an integer from 10 to 500.

Particularly preferred are those new substances of the formula (I) in which $R_1$ and $R_2$, independently of each other, represent hydrogen and/or methyl, the molecule part

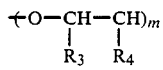

consists of 5 to 80% by weight of

—O—CH$_2$—CH$_2$—units and

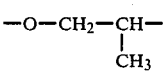

units to make up to 100% by weight in random sequence, n represents an integer from 1 to 30 and m represents an integer from 10 to 100.

DETAILED DESCRIPTION OF THE INVENTION

The substances according to the invention may, for example, have mean molecular weights of 500 to 500,000 (measured by vapor pressure osmosis or gel permeation chromatography). Preferably their mean molecular weight is between 10,000 and 100,000.

The substances of the formula (I)

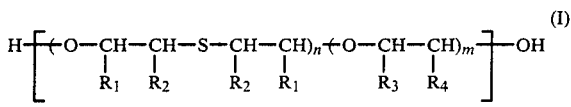

in which $R_1$ and $R_2$, independently of each other, represent hydrogen and/or a straight-chain or branched $C_1$ to $C_{20}$ alkyl group, $R_3$ and $R_4$, independently of each other and independently of adjacent

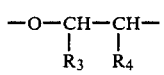

groups, in each case represent hydrogen, a straight-chain or branched $C_1$ to $C_{20}$ alkyl group and/or
—A—O—B,
where A denotes a straight-chain or branched $C_1$ to $C_{20}$ alkylene group and B denotes a straight-chain or branched $C_1$ to $C_{20}$ alkylene-OH group or a

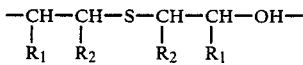

group with $R_1$ and $R_2$ defined as above,
n represents an integer from 1 to 100 and
m represents an integer from 10 to 2,500,
may, for example, be prepared by reacting an optionally polymeric thiodiglycol of the formula (II)

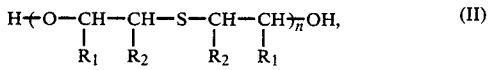

in which $R_1$, $R_2$ and n have the meanings specified above, with a polyalkyleneoxide of the formula (III)

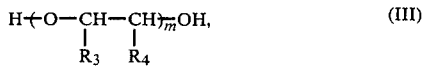

in which $R_3$, $R_4$ and m have the meanings specified above, at elevated temperature and in the presence of substances with an acidic reaction.

Preferably use is made in this process of polymeric thiodiglycols of the formula (II) in which $R_1$ and $R_2$, independently of each other, represent hydrogen and/or a straight-chain or branched $C_1$ to $C_6$ alkyl group and n represents an integer from 5 to 30.

Particularly preferred is the use of thiodiglycol bis(2-hydroxyisopropyl)sulphide and bis(2-hydroxyisobutyl)-sulphide and their polymers.

Of the polyalkyleneoxides of the formula (III) those are preferably used in which $R_3$ and $R_4$, independently of each other and independently of adjacent

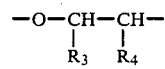

groups, in each case represent hydrogen or a straight-chain or branched $C_1$ to $C_6$ alkyl group and m represents an integer from 10 to 100.

Particularly preferred is the use of ethylene oxide/propylene oxide mixed and block polymers which contain in total 10 to 100 ethylene oxide and propylene oxide units.

Thiodiglycols of the formula (II) with n=1 are known compounds or can be prepared analogously to known compounds (see, for example, Chem. Ber., 68, 588 (1935)).

Thiodiglycols of the formula (II) with N>1 may, for example, be prepared from the corresponding monomers by condensation in the presence of substances with an acidic reaction. As substances with an acidic reaction, for example, inorganic acids, such as sulphuric acid and phosphoric acid, and esters of inorganic acids are suitable. Preferred are phosphoric acid and its alkyl esters, for example triethyl phosphate. For this purpose it is preferable to employ elevated temperatures, e.g., 150° to 200° C. and to remove the water eliminated.

The thiodiglycols of the formula (II) used in the process according to the invention may undergo a change under the reaction conditions of the process according to the invention. For example, the thiodiglycols may react with themselves (n rises) or, less probably, thiodiglycol units may split off (n falls). The thiodiglycol part of the compounds of the formula (I) prepared according to the invention does not therefore necessarily, but frequently does, correspond to the thiodiglycol of the formula (II) used.

Polyalkyleneoxides of the formula (III) are known compounds or can be prepared analogously to the latter (see, for example, German Pat. No. 950,548).

Branched sulphur-containing polyalkyleneoxides of the formula (III) can be obtained by condensation of branched non-sulphur-containing polyalkyleneoxides with thioalkylene oxides or polythioalkylene oxides under conditions analogous to those as are described below for the reaction of optionally polymeric thiodiglycols of the formula (II) with polyalkyleneoxides of the formula (III).

The optionally polymeric thiodiglycols of the formula (II) can be reacted with the polyalkyleneoxides of the formula (III) in any desired molar ratios. Preferably the molar ratio of compounds of the formula (II) to compounds of the formula (III) is in the range from 1.5:1 to 1:1.5. Particularly preferably these two compounds are used in the equimolar ratio.

The reaction may be carried out optionally in the presence of solvents, for example, if this appears necessary to lower the viscosity of the reaction mixture. Suitable solvents are, for example, aromatic hydrocarbons. The addition of solvent is in general not necessary and does not influence the quality of the reaction products.

Suitable temperatures for the reaction of optionally polymeric thiodiglycols of the formula (II) with polyalkyleneoxides of the formula (III) to form the substances of the formula (I) are, for example, those from 140° to 230° C. Preferably this temperature is 180° to 200° C. As substances with an acidic reaction, for example, inorganic acids and their acid salts are suitable. Preferred are phosphoric acid, sulphuric acid, mixtures of phosphoric acid and phosphorus pentoxide (=pyrophosphoric acid), acid phosphates such as $NaH_2PO_4$ and metaphosphoric acid; particularly preferred is orthophosphoric acid ($H_3PO_4$).

Of the substances with an acidic reaction, for example, from 0.1 to 2.0% by weight referred to the monomeric thiodiglycol may be present. Preferably this quantity is from 0.3 to 0.8% by weight.

The water produced in the reaction may, for example, be distilled off at normal pressure. It may also be removed with the aid of an entrainer, e.g., of xylene or tetralin.

The present invention relates furthermore to the use of substances of the formula (I) for the breaking of water-in-oil emulsions, particularly of water-in-crude oil emulsions. In general the substances of the formula (I) are added for this purpose in quantities of 10 to 50 ppm referred to the particular water-in-oil emulsion. In many cases the substances of formula (I) act as breakers even if they are used in quantities of 10 to 20 ppm referred to the particular water-in-oil emulsion. The emulsion breakers according to the invention in general manifest their action at temperatures from approximately 30° C. and above. The breaking of emulsions takes place more rapidly or more completely in a certain period of time than with known products. In addition the emulsion breakers according to the invention can be used more universally.

For use as water-in-oil emulsion breakers the substances of the formula (I) can be used as such. However, they can also be kept available as a solution in high-boiling solvents, for example, as a 10 to 15% solution by weight in alkyl aromatics, for example xylene and this solution can be used for breaking the emulsions.

It is decidedly surprising that the substances of the formula (I), which are not fundamentally different in molecular structure from known emulsion breakers, exhibit a so considerably better breaking action on emulsions.

The following examples explain the present invention without in any way restricting it.

EXAMPLES

Example 1

(a) Preparation of a polythioalkylene oxide

A mixture of 1.170 g of thiodiglycol and 4.8 g of phosphoric acid was heated at 200° C. for 5 hours under a gentle nitrogen flow. During this process 100 ml of water distilled off. A brown highly viscous liquid was obtained which crystallized after prolonged standing (OH number 123, molecular weight 1,300).

(b) Preparation of a polythioalkylene oxide—polyalkyleneoxide

A mixture of 30 g of the polythioalkylene oxide from (a) and 200 g of polyether (with a molecular weight of 4,000 and 20% by weight of ethylene oxide and 80% by weight of propylene oxide units in the full molecule) was heated at 200° C. for 5 hours under a gentle nitrogen flow. During this process 6 ml of water distilled off. A brown viscous liquid with a mean molecular weight of 42,000 and an OH number of 2.5 was obtained.

Example 2

A mixture of 25 g of thiodiglycol and 500 g of polyether (with a mean molecular weight of 4,000, 15% by weight of ethylene oxide and 85% by weight of propylene oxide units) and also 0.5 g of phosphoric acid was heated at 200° C. for 6 hours. A yellow oil with an OH number of 21 and a mean molecular weight of 9,000 was obtained.

Example 3

The procedure was as in Example 1(b) but a polythioalkylene oxide with a mean molecular weight of 1,000 was used and condensation was continued until 4.5 ml of water had been distilled off. A yellowish viscous resin with a mean molecular weight of 14,500 (by GPC) was obtained.

Example 4

15 g of polythiodiglycol with a mean molecular weight of 1,500 were reacted analogously to Example 1(b) with 100 g of a trifunctional polyether (started from trimethylolpropane, 17.5% by weight of ethylene oxide units, 82.5% by weight of propylene oxide units). A reddish brown liquid with a mean molecular weight of 34,000 and an OH number of 16 was obtained.

Example 5

15 g of polythiodiglycol with a mean molecular weight of 2,500 were reacted analogously to Example 1(b) with 100 g of a trifunctional polyether (with a mean molecular weight of 4,000, 17.5% by weight of ethylene oxide and 82.5% by weight of propylene oxide units). A viscous fluid with a mean molecular weight of 43,000 and with an OH number of 13 was obtained.

Example 6

30 g of polythiodiglycol with a mean molecular weight of 1,000 were reacted analogously to Example 1(b) with 200 g of polyether (mean molecular weight 2,000, 20% by weight of ethylene oxide and 80% by weight of propylene oxide units). A low-viscosity liquid with a mean molecular weight of 11,000 and an OH number of 18 was obtained.

Example 7

A water-in-crude oil emulsion extracted from a north German deposit which contained 30% by weight of water was broken at a temperature of 40° C. by adding various emulsion breakers, each in a quantity of 20 ppm referred to the emulsion.

After 120 minutes a reemulsification was carried out and the separation behavior observed again. The results are shown in Table 1.

In Table 1 "P.A.A." denotes the prior art in which the breaker was a linear 1,2-polypropylene oxide with a molecular weight of 2,000 to which ethylene oxide had been added in a weight ratio of 4:1.

In Table 1 "P.A.B." denotes the prior art in which the breaker was a nonylphenol formaldehyde condensate prepared by means of an acidic catalyst to which 90% of its weight of ethylene oxide had been added.

TABLE 1

| Breaker obtained as in | Water separated in % by weight of the water originally present after | | | | | |
|---|---|---|---|---|---|---|
| | 10 | 30 | 60 | 120 | 180 | 240 minutes |
| Example 1 | 50 | 83 | 90 | 97 | 97 | 100 |

TABLE 1-continued

| Breaker obtained as in | Water separated in % by weight of the water originally present after | | | | | |
|---|---|---|---|---|---|---|
| | 10 | 30 | 60 | 120 | 180 | 240 minutes |
| Example 2 | 3 | 33 | 43 | 50 | 70 | 73 |
| Example 3 | 53 | 82 | 87 | 93 | 97 | 99 |
| Example 4 | 48 | 80 | 86 | 88 | 92 | 94 |
| Example 5 | 47 | 79 | 82 | 86 | 93 | 98 |
| Example 6 | 51 | 82 | 88 | 96 | 98 | 99 |
| P.A.A. | 3 | 5 | 29 | 58 | 64 | 68 |
| P.A.B. | 10 | 17 | 20 | 24 | 43 | 48 |

Example 8

The procedure was as in Example 7, but a water-in-crude oil emulsion extracted from a deposit in Upper Austria was used which contained 42% by weight of water, and the emulsion breaker was added in a quantity of 30 ppm referred to the emulsion. The results are shown in Table 2.

TABLE 2

| Breaker obtained as in | Water separated in % by weight of the water originally present after | | | | |
|---|---|---|---|---|---|
| | 30 | 60 | 120 | 180 | 240 minutes |
| Example 1 | 76 | 86 | 94 | 95 | 96 |
| Example 3 | 67 | 74 | 91 | 92 | 93 |
| Example 6 | 69 | 82 | 93 | 95 | 95 |

Example 9

The procedure was as in Example 7, but a water-in-crude oil emulsion extracted from a deposit in the North Sea region was used which contained 30% by weight of water, and the emulsion breaker was added in a quantity of 30 ppm referred to the emulsion. The results are shown in Table 3.

TABLE 3

| Breaker obtained as in | Water separated in % by weight of the water originally present after | | | | | |
|---|---|---|---|---|---|---|
| | 10 | 30 | 60 | 120 | 180 | 240 minutes |
| Example 1 | 10 | 63 | 80 | 97 | 96 | 98 |
| Example 6 | 14 | 57 | 87 | 97 | 97 | 100 |

It will be appreciated that the instant specification and claims are set forth by way of illustration and not limitation, and that various modifications and changes may be made without departing from the spirit and scope of the present invention.

We claim:

1. A method for breaking water-in-oil emulsions comprising adding a sulphur-containing polyether of the formula

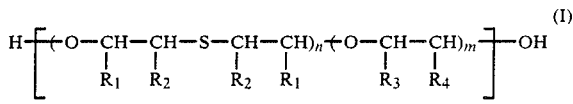

in which
R$_1$ and R$_2$, independently of each other represent hydrogen and/or a straight-chain or branched C$_1$ to C$_{20}$ alkyl group,
R$_3$ and R$_4$, independently of each other and independently of adjacent

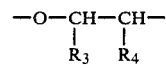

groups, in each case represent hydrogen, a straight-chain or branched C$_1$ to C$_{20}$ alkyl group and/or —A—O—B, where
A denotes a straight-chain or branched C$_1$ to C$_{20}$ alkylene group and
B denotes a straight-chain or branched C$_1$ to C$_{20}$ alkylene-OH group or a

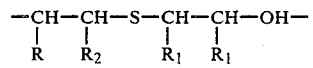

group with R$_1$ and R$_2$ as defined above,
n represents an integer from 1 to 100 and
m represents an integer from 10 to 2500, said polyether having a mean molecular weight of 10,000 to 100,000, to a water-in-oil emulsion.

2. A method for breaking water-in-oil emulsions according to claim 1, wherein the water-in-oil emulsion is a water-in-crude oil emulsion.

3. A method for breaking water-in-oil emulsions according to claim 1, wherein said sulfur-containing polyether is added in quantities of 10 to 50 ppm with respect to the water-in-oil emulsion.

4. A method for breaking water-in-oil emulsions according to claim 1, wherein said sulfur-containing polyether is added in quantities of 10 to 20 ppm with respect to the water-in-oil emulsion.

5. A method for breaking water-in-oil emulsions according to claim 1, wherein said method is conducted at temperatures greater than 30° C.

6. A method for breaking water-in-oil emulsions according to claim 1, wherein said sulfur-containing polyether is added in a solution with a high-boiling solvent.

7. A method for breaking water-in-oil emulsions according to claim 6, wherein said solution is a 10 to 15% solution by weight of an alkylaromatic.

* * * * *